May 14, 1935. W. G. E. SMITH 2,001,271
GATE VALVE
Filed Dec. 3, 1930 2 Sheets-Sheet 2

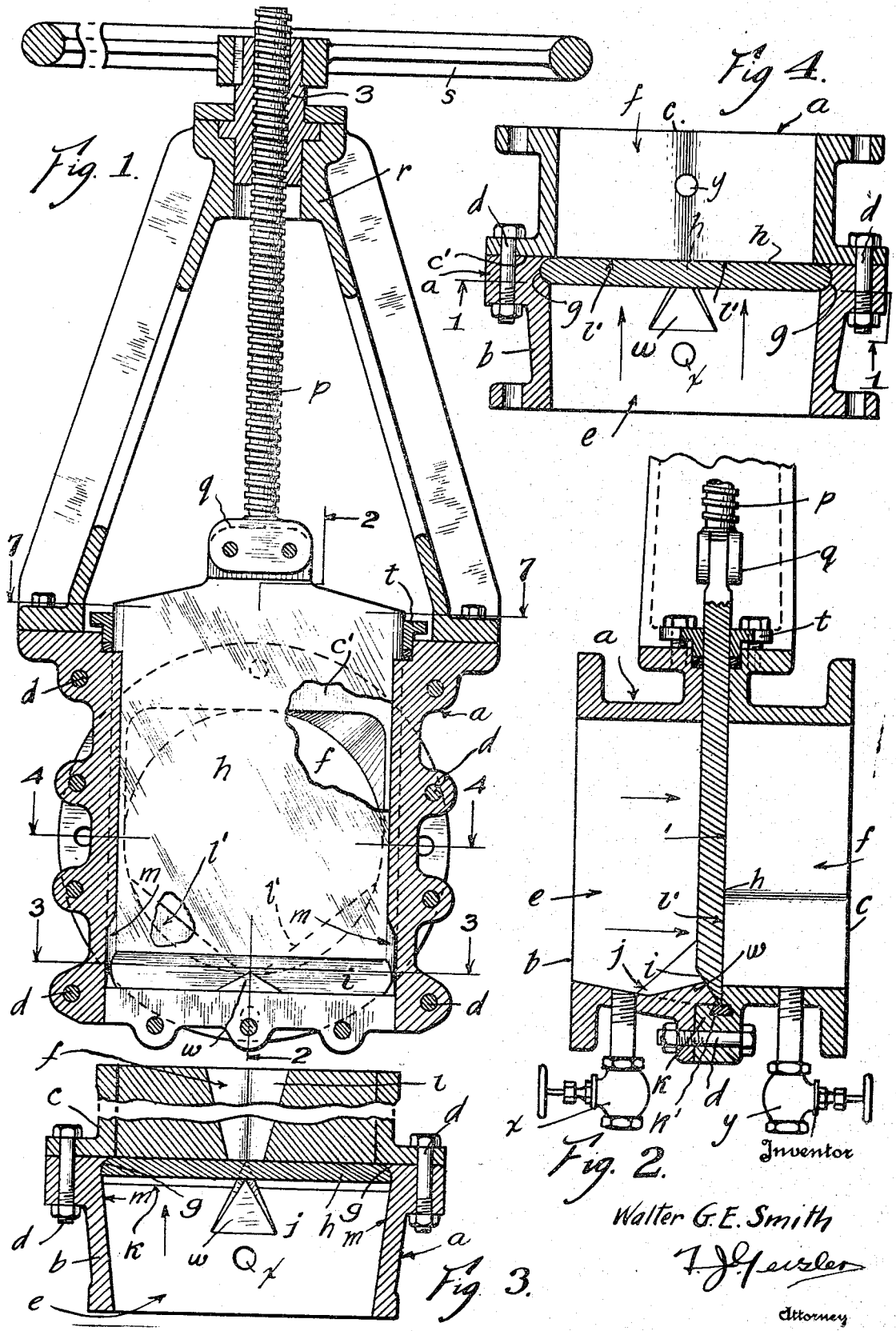

Inventor
Walter G. E. Smith
By F. J. Geisler
Attorney

Patented May 14, 1935

2,001,271

UNITED STATES PATENT OFFICE 2,001,271

GATE VALVE

Walter G. E. Smith, Portland, Oreg.

Application December 3, 1930, Serial No. 499,709

6 Claims. (Cl. 251—55)

The object of my invention is to provide a valve adapted for controlling the flow of heavily laden liquids in a pipe line, such as pulp stock in a paper mill.

Heretofore, in such valves, the pulp stock or other material tended to collect or lodge in the grooved valve seat, so that when the valve member is being closed the pulp is pressed between the valve and its seat and not only eventually prevents the valve from being entirely closed, but forms a hard tenacious, cement-like mass that resists the opening of the valve, and also lodges between the valve and the faces of the seat and tends to spring the valve member so that it is operated with difficulty.

Furthermore, valves of the gate type are frequently of large diameter, and are provided with cylindrical outlet ports with the result that as the valve is being closed the pressure of the liquid tends to bow the gate at the center and causes the latter to bind against its seat, and not only interfere with its operation, but also effects an imperfect closure, resulting in a leaking valve. Further, in a gate valve of this class, the pulp stock or other material tends to collect in the guideways or grooves of the gate and cause the latter to bind and makes it very difficult to operate. This is aggravated by the fact that pulp, if permitted to dry, forms a hard glue-like substance from which the gate may only be broken away by taking the valve housing apart.

The principal object of my invention is to provide a gate valve especially adapted for controlling the flow of heavily laden material through a pipe line without permitting the lodging of material on the valve seat and the springing or bowing of the gate out of shape by material collected in the said seat, or by the pressure in the pipe line.

A further object of my invention is to provide a gate valve which will not accumulate material interfering with the closing of the gate, but is self-cleaning.

A further object of my invention is to provide a strong and easily operated gate valve comprising but few parts, economical of manufacture, and efficient in service.

Further, the guide grooves in the housing walls for the gate are cut away at their lower ends on the inlet side by the said recess in the bottom of the housing, whereby material collecting in the said grooves may be cleared away by the downward movement of the gate.

The above mentioned and other incidental features of my invention I attain by the construction and combinations hereinafter fully described with reference to the accompanying drawings.

In the drawings:

Fig. 1 shows a vertical section of my gate valve looking towards its inlet side, the view being a section taken on the line 1—1 of Fig. 4 and looking in the direction pointed by the arrows; the gate being in closed position as in Fig. 2;

Fig. 2 shows a central longitudinal vertical section of my valve taken on the line 2—2 of Fig. 1;

Fig. 3 shows a horizontal section taken on the line 3—3 of Fig. 1;

Fig. 4 shows a horizontal section taken on the line 4—4 of Fig. 1;

Figure 5:
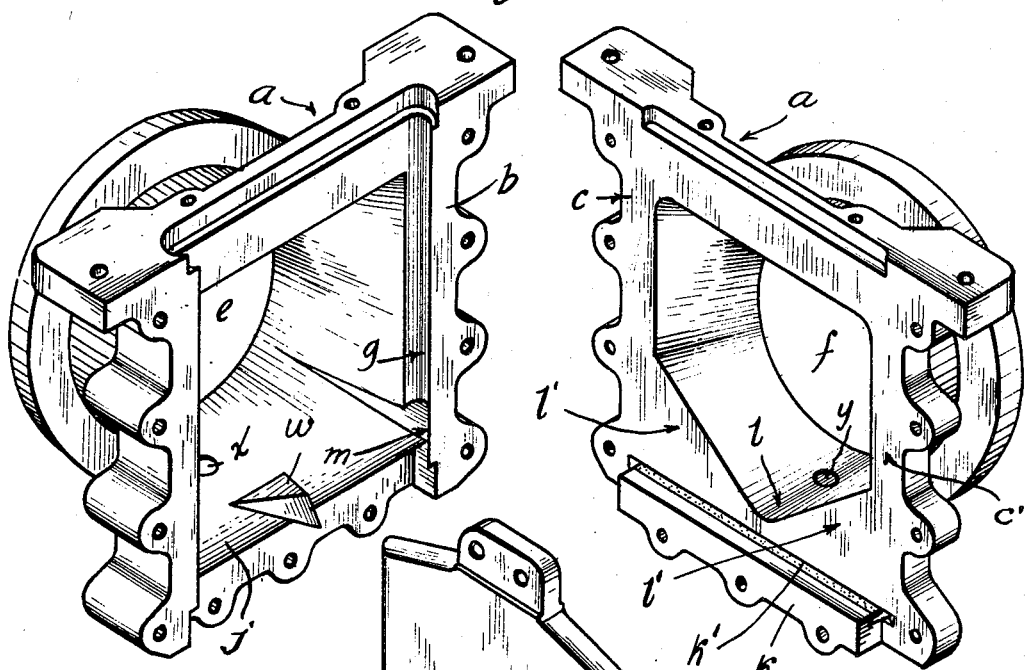
Fig. 5 shows a perspective interior view of the two sides forming the valve housing.

Referring now to the drawings: My gate valve comprises a divided or split housing $a$ consisting of parts $b$, $c$, secured together by bolts $d$, the part $b$ housing the inlet port $e$ and the part $c$ the outlet port $f$, see Fig. 5.

Figure 6:
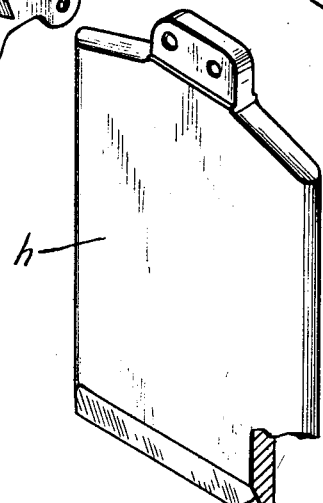
Fig. 6 shows a sectional perspective view of the gate removed from the valve.
Figure 7:
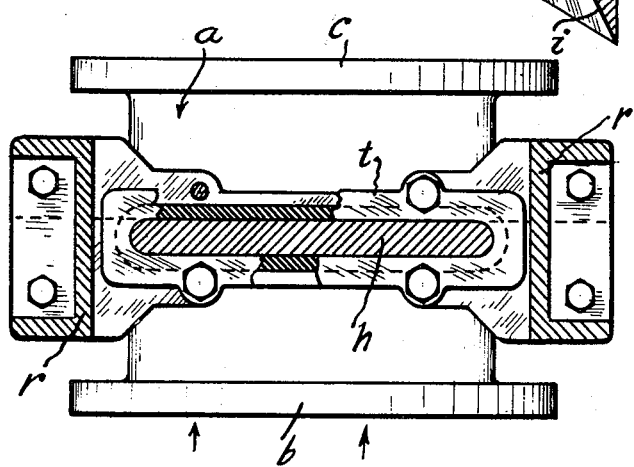
Fig. 7 shows a horizontal section taken on the line 7—7 of Fig. 1 and illustrates the packing gland in which the gate slides.

Rounded guide grooves $g$ are formed in the housing part $b$ in which the gate $h$ is slidable. The gate $h$ is tapered or beveled, as at $i$, at its lower edge towards the outlet side, to form a knife edge, see Fig. 6.

The housing part $b$ is more or less rectangular in cross section in its interior; the bottom surface $j$ slopes downward toward the seat $k$ of the gate $h$. A soft metal packing $k'$ is provided in the seat $k$ on which the knife edge of the gate $h$ bears when closed.

By this construction, any pulp stock or other material which may collect on the face $c'$ of the housing part $c$ is scraped off by the gate $h$ into the recess $j$ hence is prevented from being compressed or otherwise adhering to the valve housing, or interfering with the operation of the valve. When the gate is again opened, the material so collected in the recess will be carried away by the flow of material through the gate valve.

The outlet port $f$ in the housing part $c$ is formed V-shaped at the bottom, as at $l$, whereby the outlet opening, as the gate is closed, is diminished laterally by the wall portion $l'$ at an equal and uniform rate and the gate is thus supported at its sides as it is closed, and the pressure of the material on the gate, which increases relatively to the decreased size of the opening, is prevented from springing or bowing the gate against the outlet port, and thus interfering with the operation of the gate. This is particularly important for the reason that in providing the lower edge of the gate with a beveled edge, it is somewhat weakened, and the tendency to be bowed by the pressure of the stock is increased.

The forming of the interior wall portions $l'$, $l'$ of the housing part $c$ V-shaped at the bottom, as mentioned, also facilitates the closing of the gate, since it causes its bottom knife edge to make an oblique cut instead of chopping—as it were—thru the stock flowing thru the valve.

Further, the grooves $g$ in which the gate $h$ is slidable are cut away as at $m$ at the bottom on the inlet side, down to the inclined bottom surface, $j$, see Figs. 1 and 5; thus any stock that has accumulated in said grooves is scraped off by the edge of the gate and discharged on to the bottom surface or floor of the housing and carried away with the next flow of material thru the gate valve.

A screw element $p$ is connected to the upper edge of the gate $h$, as at $q$, and is threaded into a bushing 3 rotatably mounted in the apex of an inverted V-shaped frame $r$ secured to the top of the housing. An operating wheel $s$ is carried by the said bushing 3 for rotating the bushing to raise and lower the gate $h$ in its grooves. A packing gland $t$ is provided in the upper portion of the opening in which the valve member is slidable to prevent leakage at this point.

In order to brace the gate $h$ on the inlet side in the case of a possible back pressure, I provide a pyramidal protrusion $w$ in the floor of the valve, the apex of which bears against the gate with a line contact, so that pulp stock will not collect between the protrusion and the gate.

Further, to permit the valve being flushed out, I provide water valves $x$, $y$ in the inlet and outlet sides respectively, to wash away any "slugs" of stock which might form while the valve is closed and tend to clog the pipe line.

I claim:

1. In a gate valve, a housing provided with inlet and outlet ports, a gate slidable between said ports in grooves formed in the side walls of said housing, the said side walls of said inlet side being provided at the bottom with cavities connecting with said grooves, in which to receive the material scraped off by the gate while being closed.

2. In a gate valve, a housing provided with inlet and outlet ports, a gate slidable between said ports in grooves formed in the side walls of said housing, the floor of the inlet side of the housing inclining downward towards the cutting edge of said gate when in closed position, and the said side walls of said inlet side being provided at the bottom with cavities connecting with said grooves, in which to receive the material scraped off by the gate while being closed.

3. In a gate valve, a housing provided with inlet and outlet ports, a gate slidable between said ports in grooves formed in the side walls of said housing, a transverse wall separating the inlet and outlet ports, such wall provided with an opening, the gate sliding against said wall, the lower end of said opening formed V-shape, whereby said wall supports the gate against the thrust of the pressure of the inlet fluid while the gate is being closed, and the cutting edge of the gate makes relatively an oblique cut thru the material located in said opening.

4. In a gate valve, a housing provided with inlet and outlet ports, a gate slidable between said ports in grooves formed in the side walls of said housing, a transverse wall separating the inlet and outlet ports, such wall provided with an opening, the gate sliding against said wall, the lower end of said opening formed V-shape, whereby said wall supports the gate against the thrust of the pressure of the inlet fluid while the gate is being closed, and the cutting edge of the gate makes relatively an oblique cut thru the material located in said opening, and the floor of the inlet side of the housing provided with a supplementary support for the middle of the lower end of the gate in closed position.

5. In a gate valve, a housing provided with inlet and outlet ports, a gate slidable between said ports in grooves formed in the side walls of said housing, a transverse wall separating the inlet and outlet ports, such wall provided with an opening, the gate sliding against said wall, the lower end of said opening formed V-shape, whereby said wall supports the gate against the thrust of the pressure of the inlet fluid while the gate is being closed, and the cutting edge of the gate makes relatively an oblique cut thru the material located in said opening, the side walls of said inlet side being provided at the bottom with cavities connecting with said grooves, in which to receive the material scraped off by the gate while being closed.

6. In a gate valve, a housing provided with inlet and outlet ports, a gate slidable between said ports in grooves formed in the side walls of said housing, a transverse wall separating the inlet and outlet ports, such wall provided with an opening, the gate sliding against said wall, the lower end of said opening formed V-shape, whereby said wall supports the gate against the thrust of the pressure of the inlet fluid while the gate is being closed, and the cutting edge of the gate makes relatively an oblique cut thru the material located in said opening, the floor of the inlet side of the housing inclining downward towards the cutting edge of said gate when in closed position, and the said side walls of said inlet side being provided at the bottom with cavities connecting with said grooves, in which to receive the material scraped off by the gate while being closed.

WALTER G. E. SMITH.